United States Patent Office 2,837,815
Patented June 10, 1958

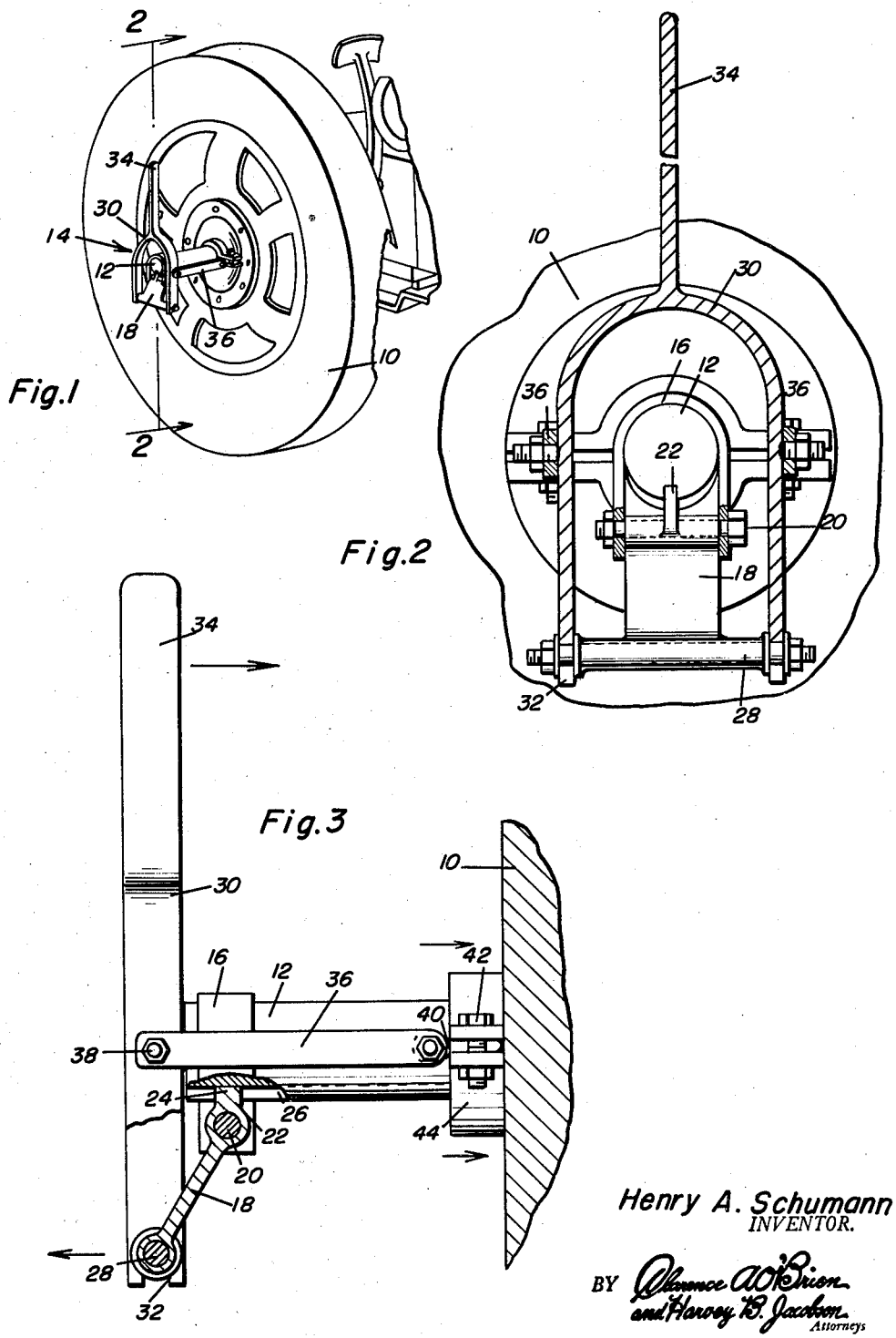

2,837,815

WHEEL ADJUSTER

Henry A. Schumann, Moberly, Mo., assignor of fifty percent to Robert A. Wirth and fifty percent to Leonard E. Harris, both of Nebraska City, Nebr.

Application October 9, 1953, Serial No. 385,240

2 Claims. (Cl. 29—267)

This invention relates to a wheel adjuster and more specifically provides an attachment for moving a wheel of a tractor along the axle thereof, thereby adjusting the width between the rear tractor wheels.

An object of this invention is to provide a wheel adjuster which may be used in moving tractor wheels inwardly or outwardly along the tractor axle, thereby adjusting the distance between the tractor wheels, thereby facilitating the use of the tractor in different crops where the distance between the rows may vary.

Another object of this invention is to provide a wheel adjuster which may be used on the outside of the wheel or on the inside of the wheel.

A further object of this invention is to provide a wheel adjuster which is simple in operation, easy to attach to a tractor, inexpensive to manufacture and performing its functions with a minimum of effort.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing the wheel adjuster of this invention in operative position on the rear axle of a tractor;

Figure 2 is a transverse, vertical section taken substantially along section line 2—2 of Figure 1 showing details of the wheel adjuster; and Figure 3 is a side elevation view with portions in section showing the relationship of the wheel adjuster to the axle and the tractor wheel.

Referring now specifically to Figure 1 of the drawings, it will be seen that the numeral 10 generally designates the rear wheel of a tractor mounted upon the usual axle member 12 and the numeral 14 generally designates the wheel adjuster of this invention.

The wheel adjuster 14 includes a U-shaped clevis 16 passing over the axle 12 and a pivotal member 18 pivotally secured to the leg portions of the U-shaped clevis by a suitable pivot axis 20, and an eccentric member 22 is rigidly secured to the pivotal member 18 and engages the undersurface of the axle 12 and includes a portion 24 engageable with a slot 26 along the periphery of the axle 12. On the end of the pivotal member 18 remote from the eccentric portion 22 is disposed a pivot axis 28 for pivotally receiving a yoke member 30. The yoke member 30 is generally U-shaped with a slot 32 in the free ends of the leg portions and a handle 34 extending upwardly from the bight portion of the yoke 30 in opposition to the slots 32. A pair of links 36 are pivoted adjacent the midpoint of the leg members of the yoke member 30 on suitable pivot studs 38 and eye members 40 are pivotally attached to the remote ends of the links 36 and surround the clamping bolts 42 in the axle clamp 44 which conventionally holds the wheel 10 to the axle 12.

The operation of the device will be readily understood. The U-shaped clevis 16 is positioned over the axle 12 with the eccentric 22 engaging the notch 26 on the axle 12 and the bolts 42 holding the clamp 44 to the axle are loosened and the eye members 40 are positioned between the mating clamp members 44 and the slotted portions 32 of the yoke member 30 are positioned over the pivot axis 28 whereupon any pressure upon the handle 34 will give a corresponding pressure or force on the links 36, thereby moving the clamp 44 and the wheel 10. Obviously, upon pushing the handle 34 inwardly, the wheel 10 moves inwardly, and when the handle is pulled outwardly, the wheel moves outwardly. This eliminates the use of the complicated chains and hydraulic jacks often employed in adjusting and removing tractor wheels, and obviously, the device may be used on the inside of a tractor wheel by merely disconnecting the yoke member 30 from the remainder of the device thereby permitting the device to be attached to the axle between the wheels and the frame. Due to the action of the flat portion 24 engaging the slot 26, the device will work equally well in either direction, and as the force on the handle increases, the biting action of the eccentric member 22 increases, thereby preventing any slippage of the wheel adjuster. Obviously, the instant device may be used in removing wheels as well as in adjusting the distance between the rear wheels for accommodating various widths of rows of crops.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A wheel adjuster for moving a wheel mounted on an axle comprising a member partially encircling and engaging the axle, means pivotally mounted on said member to clampingly engage the axle in opposition to the member, a yoke member pivotally secured to said clamp means, and link means interconnecting the yoke and wheel for moving the wheel on the axle upon pivotal movement of the yoke, said link means generally lying alongside said member and axle for exerting force generally parallel thereto.

2. An implement for moving a wheel on an axle with the wheel being secured thereto with a clamp having clamp bolts which may be loosened for permitting movement of the wheel, said implement comprising a pair of links connected to said clamp bolts and extending alongside the axle in generally parallel relation thereto, a U-shaped yoke disposed in straddling and radially spaced relation to the axle with the outer ends of the links being pivotally connected to the yoke, an outwardly extending handle on the bight portion of said yoke, a U-shaped clevis disposed on said axle and engaging a portion of the periphery thereof, a member pivotally interconnecting the free ends of the yoke and the clevis, a rigid projection on said member for engagement with the axle, said projection having a generally flat surface engaging the axle in opposition to the clevis whereby pivotal movement of the member will rigidly clamp the clevis and projection to the axle whereby force may be exerted on clamp bolts for moving the clamp and wheel on the axle, the orientation of the pivot connection between the yoke and links and between the yoke and member permitting the force exerted on the handle to be multiplied for moving the wheel.

References Cited in the file of this patent

UNITED STATES PATENTS

| | | |
|---|---|---|
| 870,931 | Claiborne | Nov. 12, 1907 |
| 2,060,214 | Hitchens | Nov. 10, 1936 |
| 2,691,211 | Leiber | Oct. 12, 1954 |
| 2,700,815 | Smithson | Feb. 1, 1955 |